April 7, 1964     I. W. RICHARDSON     3,127,725

FRUIT PICKER

Filed Sept. 20, 1961     6 Sheets-Sheet 1

INVENTOR
IRWIN W RICHARDSON

BY

ATTORNEY

April 7, 1964  I. W. RICHARDSON  3,127,725
FRUIT PICKER

Filed Sept. 20, 1961  6 Sheets-Sheet 2

INVENTOR
IRWIN W. RICHARDSON

BY
ATTORNEY

April 7, 1964     I. W. RICHARDSON     3,127,725

FRUIT PICKER

Filed Sept. 20, 1961     6 Sheets-Sheet 3

INVENTOR
IRWIN W. RICHARDSON

ATTORNEY

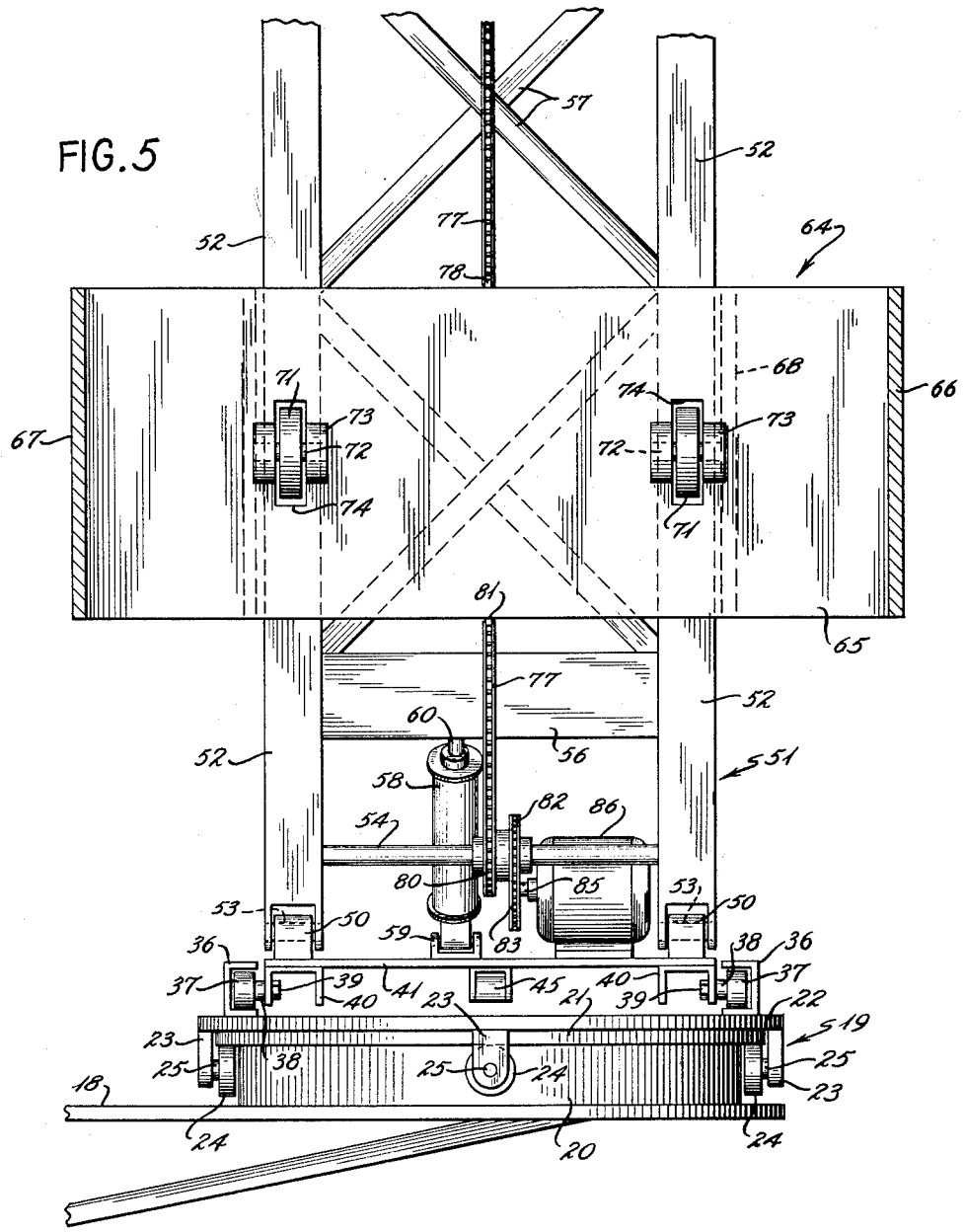

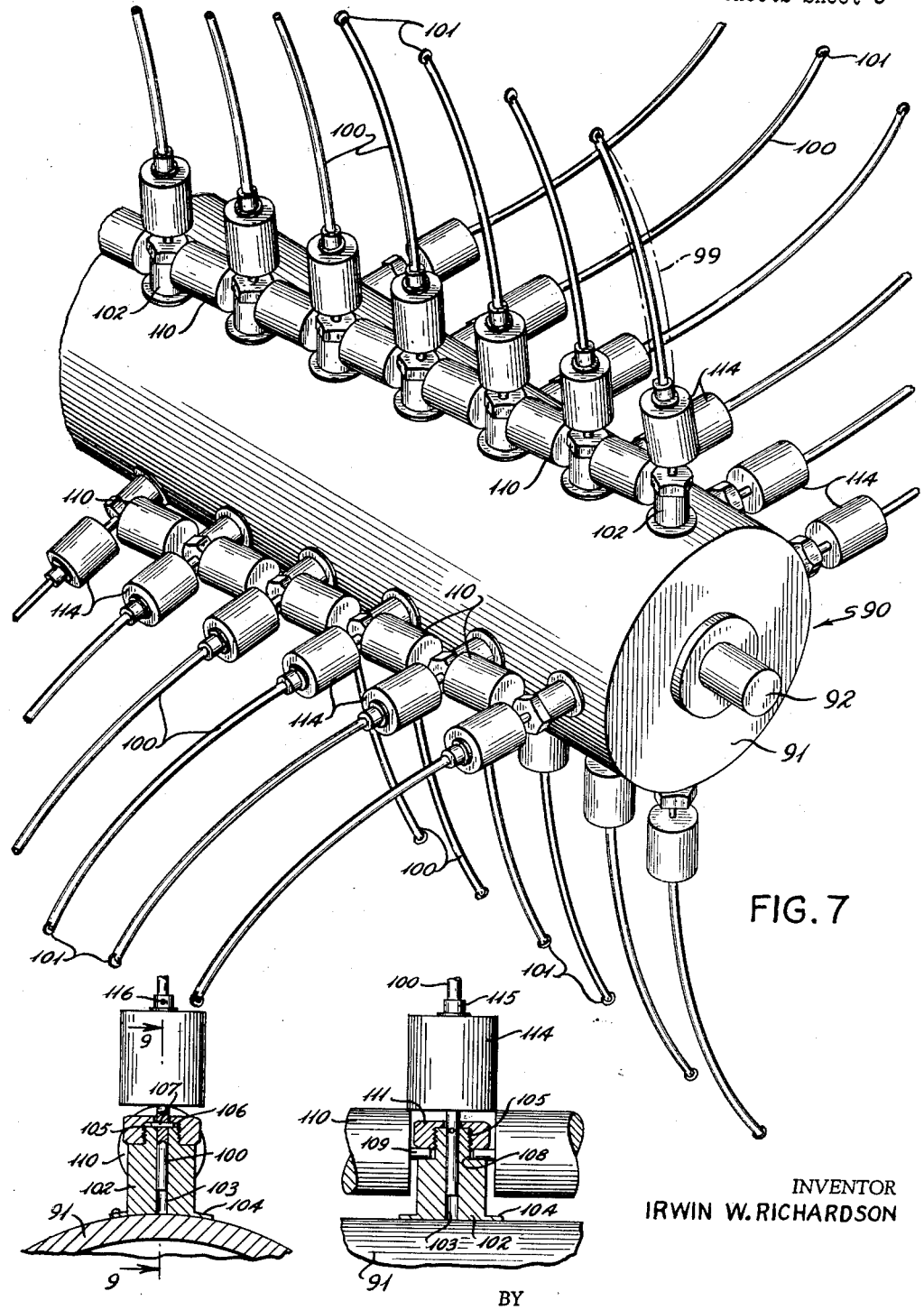

April 7, 1964 I. W. RICHARDSON 3,127,725
FRUIT PICKER
Filed Sept. 20, 1961 6 Sheets-Sheet 6
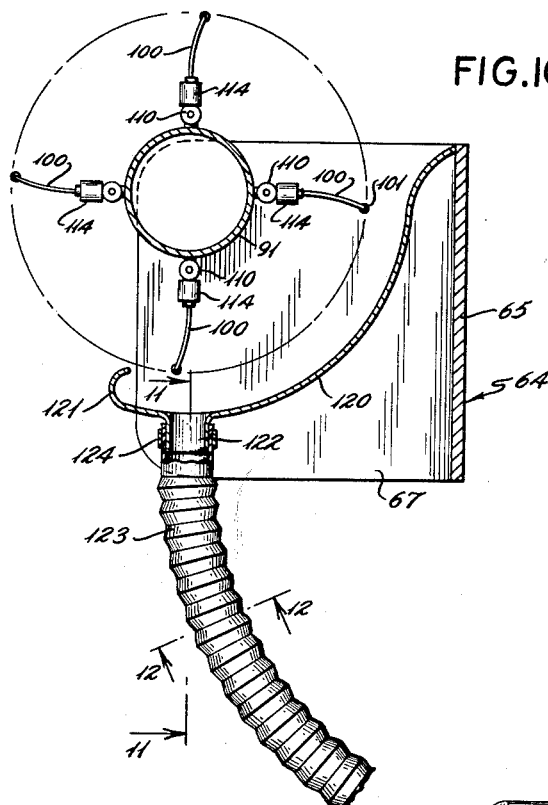
FIG.10
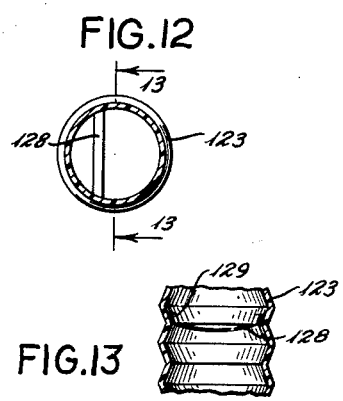
FIG.12
FIG.13
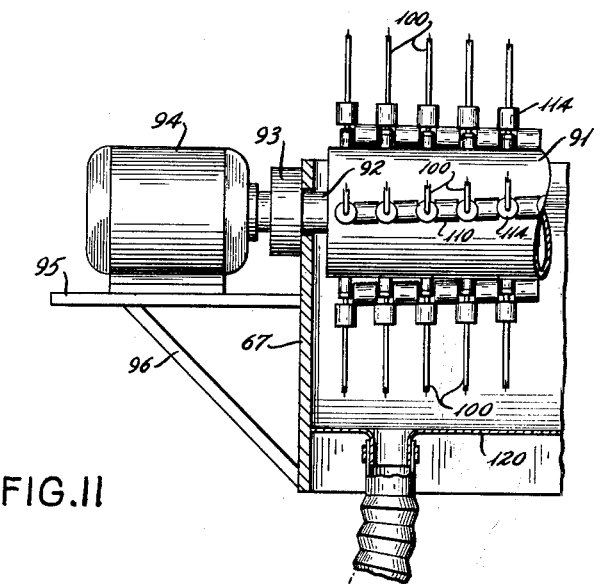
FIG.11
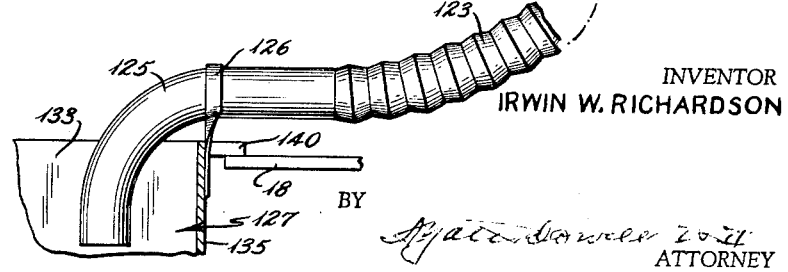
INVENTOR
IRWIN W. RICHARDSON
BY
ATTORNEY

United States Patent Office 3,127,725
Patented Apr. 7, 1964

3,127,725
FRUIT PICKER
Irwin W. Richardson, Drawer I, Lady Lake, Fla.
Filed Sept. 20, 1961, Ser. No. 139,398
4 Claims. (Cl. 56—328)

This invention relates to the picking of fruit, with minimum impact with other solids of a character likely to cause damage thereto, and to apparatus and equipment by which the detachment and collection of the fruit can be accomplished.

The invention relates particularly to the picking or removal of citrus and other fruits of various sizes and shapes from the trees on which they are grown and to apparatus or equipment by which the separation and the collection of the fruit can be performed.

The picking of oranges as well as citrus and other fruits and products has been accomplished primarily by hand including by workmen on ladders with bags to be filled with the fruit as it is picked. This manner of picking fruit is laborous, time consuming and places a limit on the results that can be accomplished.

It is an object of the invention to solve the problem indicated and to provide equipment by which oranges, and other fruits or objects can be quickly picked and collected with minimum effort by a single operator and without bruising or otherwise damaging the fruit.

Another object of the invention is to provide a fruit picker which can be mounted on a conventional tractor in a manner to be disposed in any desired horizontal position, at any desired angle, and at any desired elevation, and by means of which oranges or other objects can be detached and collected, in a minimum of time, with a minimum of ease, and without injury to the collected objects or to the trees from which they were detached.

A further object of the invention is to provide an orange or the like picker of the general character indicated in which the picker mechanism is mounted for elevational variation on an upright or angular position which can be varied, and which upright is mounted on a turn table for horizontal movement or reciprocation relative thereto through a range of 360° on its support, and with means for accomplishing the various motions from the power plant of the tractor or vehicle.

Figure 1:
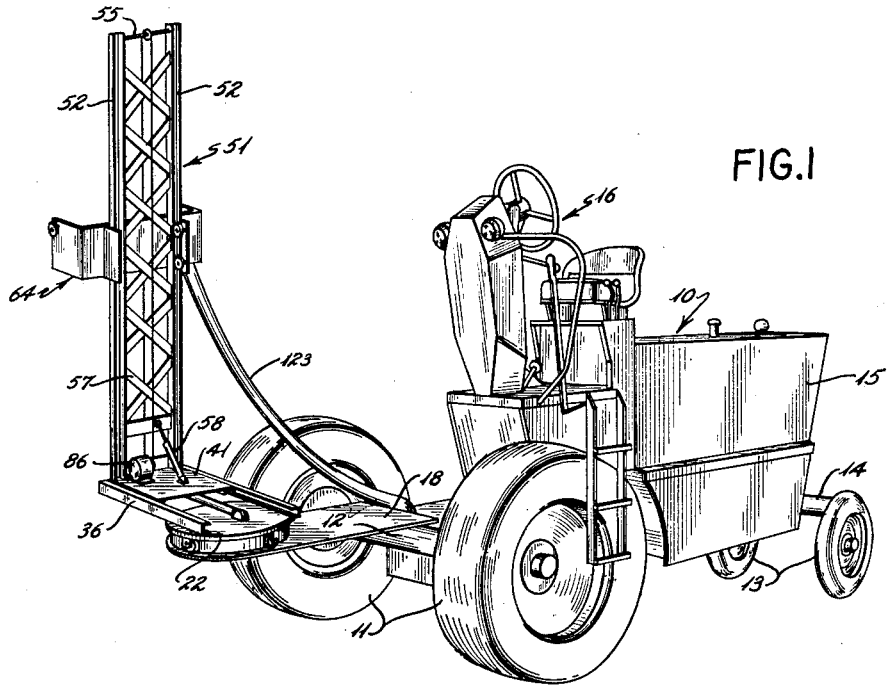
Figure 2:
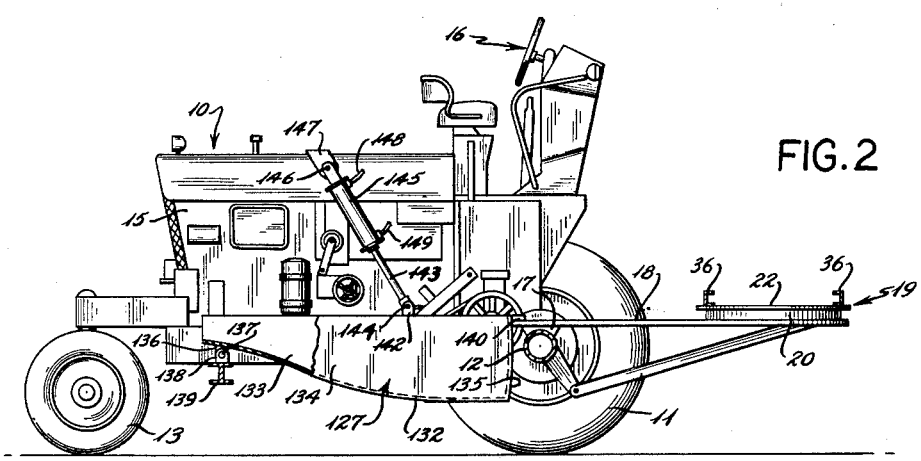
Figure 3:
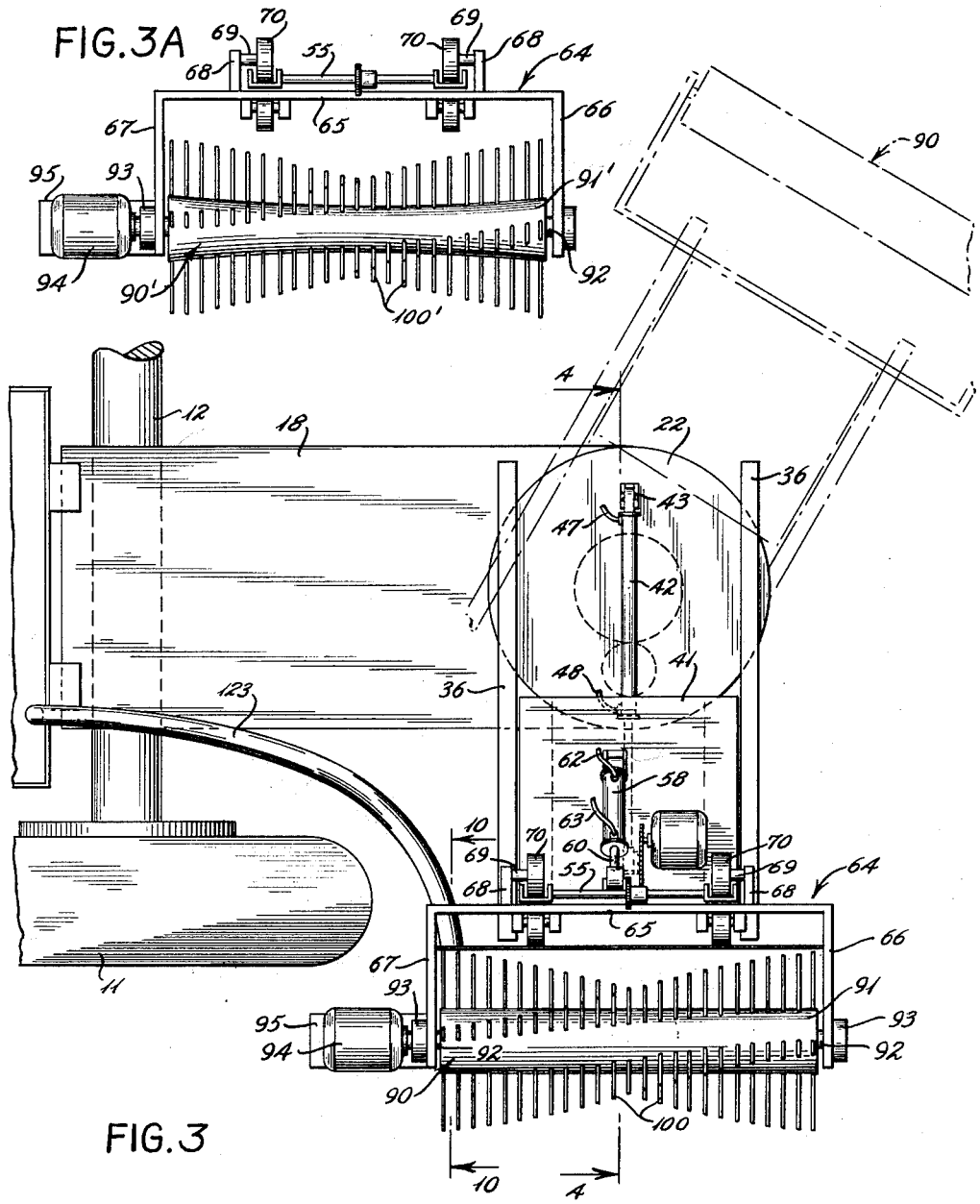
Figure 4:
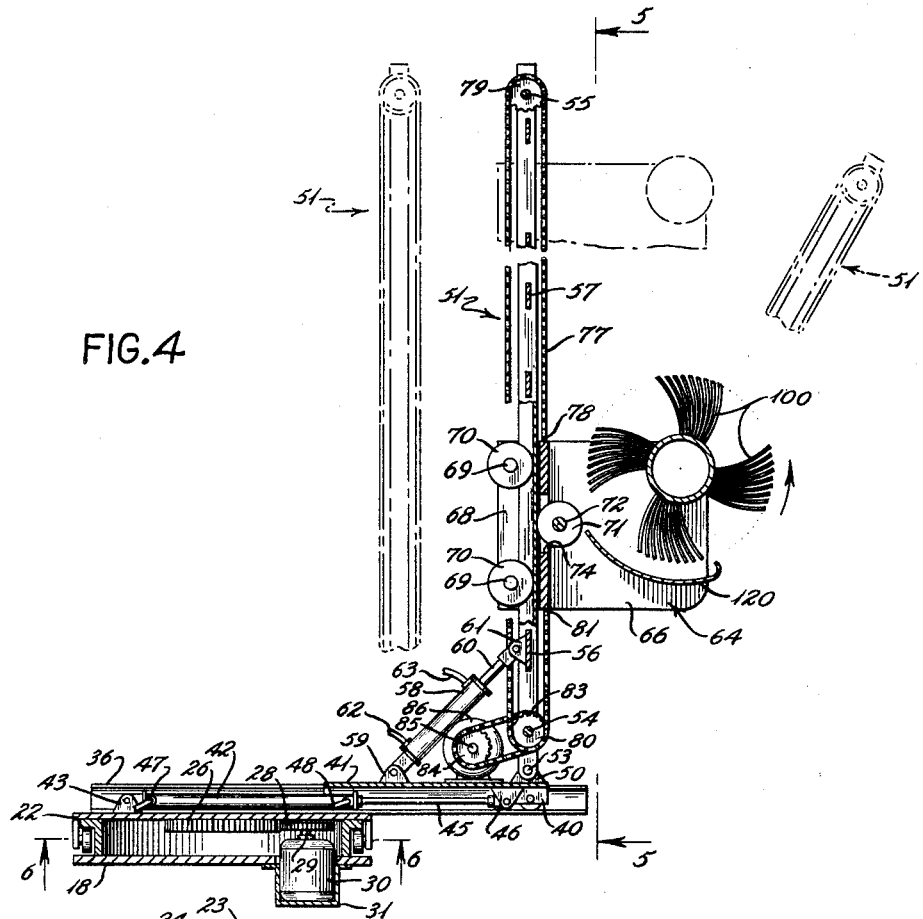
Figure 6:
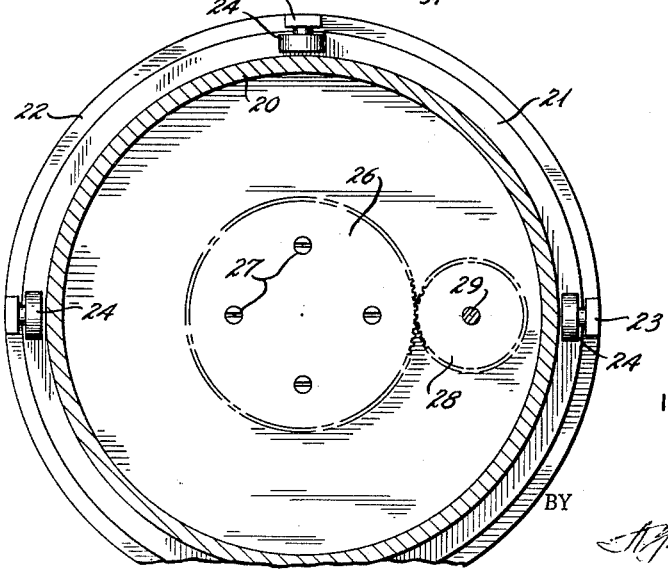

Other objects and advantages of the invention will be apparent from the following description taken in conjunction with the accompanying drawings in which:

FIG. 1 is a perspective of a tractor to which the invention is applied;

FIG. 2, a side elevational of the tractor and mounting for the picker;

FIG. 3, an enlarged top plan view;

FIG. 3A, a top plan view of a modified form of picker head;

FIG. 4, a vertical section on the line 4—4 of FIG. 3;

FIG. 5, a further enlarged section on the line 5—5 of FIG. 4;

FIG. 6, an enlarged horizontal section on the line 6—6 of FIG. 4;

FIG. 7, a greatly enlarged perspective of the picker cylinder with its tines and rollers;

FIG. 8, a section of the base of one of the tines or fingers;

FIG. 9, a section on the line 9—9 of FIG. 8;

FIG. 10, an enlarged fragmentary section on the line 10—10 of FIG. 3;

FIG. 11, a partial section on the line 11—11 of FIG. 10 which also shows the collection bin;

FIG. 12, an enlarged section on the line 12—12 of FIG. 10; and

FIG. 13 a section on the line 13—13 of FIG. 12.

Briefly stated, the picker of the present invention comprises a picking cylinder having a series of flexible tines or fingers spirally radiating therefrom along the length of the same with such picking cylinder mounted for lengthwise elevational movement along a standard, the angularity of which can be varied, with such standard mounted for horizontal reciprocation on a turn table attached to a tractor or other vehicle having a power plant, and with means for driving the various parts of the device from such power plant.

With continued reference to the drawings, a land vehicle 10 such as a tractor is provided with front earth engaging wheels 11 connected by an axle 12 and rear earth engaging wheels 13 carried by a tie bar 14 which includes the steering mechanism for the vehicle.

The power plant 15 and operating controls 16 are located at one side of the vehicle and the front wheels are spread apart a distance sufficient to accommodate and provide a broad base for an implement.

The axle 12 has one or more brackets 17 welded or otherwise secured to the upper portion thereof and such brackets are adapted to support a platform 18 which extends forwardly of the vehicle and the outer end of which supports a turntable 19.

The turntable 19 comprises a base ring 20 (FIG. 6) having an outwardly turned flange 21, the upper surface of which provides a bearing surface for a rotatable plate 22 having a series of depending arms 23 on which rollers 24 are mounted by pivot pins 25 located in a position whereby rollers 24 will engage the lower surface of the flange 21 and prevent any rocking or lifting motion by the plate 22.

In order to rotate the plate 22, a gear 26 is secured to such plate by fasteners 27 (FIG. 6) and such gear meshes with a gear 28 mounted on a shaft 29 of a reversible motor 30. The motor 30 is received within a housing 31 welded or otherwise secured to and suspended below the platform 18 and the direction and amount of rotation are controlled by the operator of the vehicle.

A pair of track forming channels 36 are welded or otherwise attached to the upper surface of the plate 22 with the open channel portions disposed toward each other. The channels 36 extend outwardly of the plate 22 substantially in parallel relation and form a bearing surface for guide rollers 37 carried by stub shafts 38 (FIG. 5) mounted by fasteners 39 on the depending flanges of a pair of generally parallel base or supporting members 40. A base plate 41 is mounted on the supporting members 40 and is adapted to be moved outwardly and inwardly along the track members 36 by a fluid operated cylinder 42 (FIG. 4) connected at one end by a mounting bracket 43 attached to the rotatable plate 22. The cylinder 42 receives a piston and piston rod 45, the outer end of which is connected to a bracket 46 depending from the base plate 41 located substantially along the longitudinally axis thereof. The cylinder 42 is connected to the fluid system of the vehicle by fluid lines 47 and 48.

A pair of upstanding lugs or pivot supports 50 are mounted adjacent to the outer end of the base plate 41 with one of such lugs located at each side of such base plate. The lugs 50 support a tower standard 51, including a pair of generally parallel channel members 52 pivotally mounted by pins 53 to the lugs 50 and connected adjacent their lower extremities by a shaft 54 and adjacent their upper extremities by a shaft 55 (FIG. 4). The channel members 52 (FIG. 5) are connected by a brace 56 in proximity to the lower shaft 54 and by intermediate cross braces 57 substantially the full height of the tower or standard.

The tower or standard 51 is adapted to be moved from a substantially vertical position relative to the base plate 41 to an angular position by means of a fluid operated cylinder 58 connected at one end by a bracket 59 to the base plate 41 and such cylinder operates a piston and piston rod 60 connected to a bracket 61 (FIG. 4) on the brace 56. The cylinder 58 is under the influence of the operator of the vehicle and is connected to the fluid system of the tractor by fluid lines 62 and 63. The tower 51 may be disposed substantially vertically or at an angle either toward or from the operator of the vehicle by the movement of the piston rod 60 in the cylinder 58.

The channel members 52 are disposed with the open channel portion toward the turntable 19 and are adapted to support a yoke 64 comprising a central portion 65 with a pair of outwardly turned end portions 66 and 67 and a pair of inwardly extending parallel arms or flanges 68. Each of the arms or flanges 68 supports a pair of stub shafts 69 (FIG. 4) on which are mounted rollers 70 and such rollers are adapted to engage the web portions of the channel members 52 and are prevented from excessive side movement by the flange portions of such channel members. In order to make sure that the mounting frame 64 can move smoothly up and down the tower, a roller 71 is mounted by a pivot pin 72 carried by lug 73 (FIG. 5) on the central portion 65 of the mounting frame 64 and extends through an opening 74 in such central portion to bear against the outside of the web portion of each of the channel members 52.

The mounting frame or yoke is adapted to be moved up and down the tower by a chain 77 connected to a lug 78 in the upper portion of the central member 65 and extends upwardly around a sprocket 79 rotatably carried by the shaft 55 and then downwardly about a sprocket 80 rotatably mounted on the shaft 54 and then upwardly and is connected to a lug 81 on the lower surface of the central portion 65 of the yoke. The lower sprocket 80 is driven through the shaft 54 by a sprocket 82 which in turn is driven by a chain 83 from a sprocket 84 mounted on the shaft 85 of a reversible motor 86 mounted on the base plate 41 and under the control of the operator of the vehicle.

A picker head 90 (FIG. 3) is carried by the mounting frame 64 and comprises a cylinder 91 on a shaft 92 journaled in bearings 93 carried by the end portions 66 and 67 of the mounting frame or yoke 64. The shaft 92 is driven by a variable speed motor 94 mounted on a platform 95 connected to the end portion 67 and is provided with suitable bracing 96. As illustrated in FIGS. 4 and 7, the cylinder 91 is provided with a plurality of curved fingers 100 arranged in spiral relation along the longitudinal axis of such cylinder. The fingers are preferably constructed of flexible, acid-resistant material and each finger is provided at its tip with a roller 101 (FIGS. 7 and 10) to prevent damage to any limb or other portion of the tree with which the fingers come in contact. If desired, the fingers each may be covered by a sleeve 99 (FIG. 7) of acid-resistant material such as Teflon or the like.

In order to attach the fingers to the cylinder a post 102 having a central bore 103 is provided for each of the fingers and each post has a flange 104 (FIG. 9) for mounting the post on the cylinder. Each post 102 is provided with a reduced threaded upper portion 105 with a slot or groove 106 of a size and depth to accommodate a pin 107 carried by the finger 100. The enlarged base portion of the post 102 is provided with a slot or groove 108 in opposite sides thereof and such grooves are adapted to receive a shaft 109 extending between adjacent posts and each of such shafts rotatably supports a roller 100. A cap 111 is provided with internal threads for complementary engagement with the threaded reduced portion 105 of the post and such cap is adapted to maintain the shafts 109 within the grooves 108 and to maintain the pins 107 in the grooves 106. An additional roller 114 is rotatably mounted on each of the fingers 100 and is restrained from moving endwise by a collar 115 having a set screw 116.

In lieu of the picker head being in the form of a cylinder 91 with rollers 110 and 114 of a given size, the picker head and rollers may be varied in size and configuration. For example, as illustrated in FIG. 3A the picker head may have a rotary member 90', the surface of which has a curved surface 91' extending from end to end from a portion of minimum diameter at the center to a portion of maximum diameter at each end and the rollers may be of a different size in accordance with the use to which they are to be put. The rotary member 90' has a plurality of curved fingers 100' arranged in spiral relation along the longitudinal axis thereof.

The mounting frame or yoke 64 is provided with a collection chute 120 which is of generally arcuate configuration and is disposed immediately below the arcuate fingers 100. The chute extends upwardly to the central portion 65 of the mounting frame and the opposite edge of such chute terminates in an upwardly curved portion 121. The collection chute 120 extends from end to end of the mounting frame and is preferably inclined slightly so that the fruit which is moved from the trees by the fingers 100 will fall into the collection chute 120 and will gravitate toward the end 67 of the mounting frame.

A discharge sleeve 122, having generally cylindrical sides, is disposed at the lower end of the collection chute and is adapted to receive one end of a flexible, extensible discharge hose 123, a clamp 124 being provided for maintaining the discharge 122 and the hose 123 in assembled relation. The opposite end of the hose 123 terminates in a downwardly curved end portion 125 (FIG. 11) secured by a clamp 126 to one end of a collection bin 127. As illustrated in FIGS. 12 and 13, the hose is provided with a plurality of flexible strap-like members 128 having tabs 129 connected to the sides of the hose 123 in such a manner that the strap portion extends across the throat of the hose and breaks the fall of the fruit as it passes therethrough. The strap portion is disposed off center of the hose so that when the fruit falls by gravity the strap portion will not prevent its passage through the hose.

The collection bin 127 (FIG. 2) is of generally rectangular shape with an inclined bottom 132 and with the deepest portion of the bin being located adjacent to the platform 18. The collection bin 127 includes side walls 133 and 134 and a forward end wall 135, with such collection bin being open at its rear. One or more depending lugs 136 are fixed to the inclined bottom 132 adjacent to the open end of the bin and such lugs are connected by pivot pins 137 to brackets 138 mounted on an I-beam or other structural member 139 welded or otherwise attached to the frame of the vehicle. The forward wall 135 may have one or more forwardly extending projections 140 adapted to engage platform 18 and support the forward end of the collection bin 127. In order to discharge the contents of the collection bin 127, the wall 133 is provided with an upstanding lug 142 connected to a piston rod 144 by a pivot pin 143. The piston rod 143 is adapted to be extended and retracted by a fluid cylinder 145 mounted by a pivot pin 146 to a bracket 147 fixed to the vehicle 10. The cylinder 145 is under the influence of the operator of the vehicle through fluid lines 148 and 149 connected to the fluid system of the tractor.

In the operation of the device the vehicle 10 is driven to a position adjacent to a fruit tree, the mounting frame is lowered to its lowermost position and thereafter the base plate 41 is moved outwardly until the picker head 90 engages the lower branches of the tree. The variable speed motor 94 rotates the picker head 90 and causes the fingers 100 to move through the foliage of the tree and causes the branches of the tree to come in contact with the rollers 110 and 114 at the base of the fingers and such fingers and rollers remove any fruit from the limbs. It will thus be apparent that the picking results from the flexible fingers sweeping the fruit from the tree, the rollers 110 and 114 permitting the fruit carrying portions of the tree to pass therethrough without injury. The fingers 100 are constructed of flexible material to prevent damage to the trees and the rollers 101 in the free ends of such fingers prevent the scratching or cutting of the bark on the limbs or the like. The picker head 90 removes the fruit from the trees and deposits such fruit in the collection chute 120 where it is discharged through the hose 123 into the collection bin 127. Simultaneously with the rotation of the picker head the mounting frame is raised by the operation of the motor 86 and the tower or standard 51 is moved by the cylinders 42 and 58 so that the picker head 90 conforms to the contour of the tree as it is moved upwardly to remove all of the fruit from the tree. After the picker head has reached the top of the tree it is then lowered to its lowermost position and the vehicle is moved to a new location or, if convenient the plate 22 may be rotated to place the picker head in a new position on the same tree or on an adjacent tree.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. A fruit picker of a construction to be mounted upon a tractor or other vehicle, said picker comprising a mounting constituting an extension structure, a turntable mounted on said structure, a track mounted on said turntable, a support reciprocable on said track, a standard pivoted on said support, means whereby said turntable may be caused to revolve, said support caused to move along said track and said standard to swing about its pivot, a picker head having spaced flexible fruit engaging elements, means mounting said picker head for movement up and down said standard, and means whereby harvested fruit may be discharged in a direction toward a selected area.

2. In a device for picking fruit, a picker head comprising, a cylinder, a series of slender spring fingers mounted along and extending outwardly from said cylinder, roller means adjacent each of said spring fingers and said cylinder, a collection chute having a surface extending lengthwise of said picker head along said cylinder whereby fruit picked by said fingers will travel a minimum distance before contact with said collection chute, means for driving said cylinder and said slender flexible fingers to cause the picking of the fruit, and extended discharge means whereby the fruit may be further discharged with minimum space projection and consequently the least damage to the fruit.

3. The structure of claim 2 in which said slender spring fingers are mounted on said cylinder in generally spiral arrangement around the longitudinal axis thereof.

4. The structure of claim 2 in which said device includes a self-propelled vehicle, turntable means mounted for movement in a generally horizontal direction on said vehicle, a movable base mounted on said turntable means, a tower pivotally mounted on said base, means for controlling the angularity of said tower relative to said base, a frame for carrying said picker head mounted on said tower, and means for moving said frame up and down said tower.

References Cited in the file of this patent

UNITED STATES PATENTS

| | | |
|---|---|---|
| 301,308 | Walker | July 1, 1884 |
| 2,159,311 | Berger | May 23, 1939 |
| 2,535,542 | Lehman et al. | Dec. 26, 1950 |
| 2,571,224 | Edwards | Oct. 16, 1951 |
| 2,829,814 | Warner | Apr. 8, 1958 |
| 2,953,229 | Wiegel | Sept. 20, 1960 |
| 2,989,833 | De Fino | June 27, 1961 |
| 3,077,720 | Grove et al. | Feb. 19, 1963 |

FOREIGN PATENTS

| | | |
|---|---|---|
| 571,712 | Italy | Jan. 14, 1958 |
| 581,246 | Italy | Aug. 23, 1958 |